(12) United States Patent
Zhang et al.

(10) Patent No.: US 9,267,786 B2
(45) Date of Patent: Feb. 23, 2016

(54) PRISM BEAM EXPANDER ADJUSTMENT APPARATUS AND METHOD FOR ADJUSTING THE SAME

(71) Applicant: Shanghai Institute of Optics And Fine Mechanics, Chinese Academy of Sciences, Shanghai (CN)

(72) Inventors: Haibo Zhang, Shanghai (CN); Zhijun Yuan, Shanghai (CN); Jun Zhou, Shanghai (CN); Yunrong Wei, Shanghai (CN); Liyuan Jiang, Shanghai (CN); Liming Geng, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 0 days.

(21) Appl. No.: 14/556,065

(22) Filed: Nov. 28, 2014

(65) Prior Publication Data

US 2015/0085893 A1    Mar. 26, 2015

Related U.S. Application Data

(63) Continuation-in-part of application No. PCT/CN2013/001645, filed on Dec. 25, 2013.

(30) Foreign Application Priority Data

Dec. 28, 2012  (CN) .......................... 2012 1 0585245

(51) Int. Cl.
*G01B 11/14*  (2006.01)
*G02B 27/62*  (2006.01)
*G02B 7/18*   (2006.01)

(52) U.S. Cl.
CPC .............. *G01B 11/14* (2013.01); *G02B 7/1805* (2013.01); *G02B 27/62* (2013.01)

(58) Field of Classification Search
CPC . B65B 67/06; G03B 15/05; G03B 2215/0528
USPC .............................. 356/614–620; 372/55–100
See application file for complete search history.

(56) References Cited

U.S. PATENT DOCUMENTS 1,929,534 A * 10/1933 Long ................... B24B 13/0055
                                                      356/615
4,018,527 A * 4/1977 Bartel ....................... F21V 9/10
                                                      355/35

(Continued)

FOREIGN PATENT DOCUMENTS

CN          2434749 Y     6/2001
CN        200986762 Y    12/2007

(Continued)

OTHER PUBLICATIONS

Zhang, Haibo et al., Optimal Design of Prism Beam Expander in Line Narrowed Excimer Laser Cavity, Chinese Journal of Lasers, vol. 38, No. 11, Nov. 2011, China.

*Primary Examiner* — Kara E Geisel
*Assistant Examiner* — Iyabo S Alli
(74) *Attorney, Agent, or Firm* — Manni Li; Mei & Mark LLP

(57) ABSTRACT

An apparatus and method for adjusting prism beam expander. The prism beam expander adjustment apparatus has a light source, a baseplate, a precise rotary stage, support columns, a two-dimensional slide stage, the first 90-degree bellcrank lever, an indication light source, the second 90-degree bellcrank lever, an optical filter, a photodetector, a computer, and an assembly platform. Incidence angles of all prisms of a prism beam expander can be precisely demarcated and designed beam magnification is obtained with the preferred adjustment methods. The parallel of the prisms can be guaranteed by monitoring the pitching of the prisms in the adjustment process. As a result, the linewidth narrowing and cavity losses decreasing can be improved by application of the fixed prism beam expander.

18 Claims, 3 Drawing Sheets

(56) References Cited

U.S. PATENT DOCUMENTS

| | | | |
|---|---|---|---|
| 5,024,151 A * | 6/1991 | Girardin | B30B 9/30 100/229 A |
| 5,237,457 A | 8/1993 | Oono et al. | |
| 6,192,064 B1 | 2/2001 | Algots et al. | |
| 7,366,219 B2 | 4/2008 | Algots et al. | |

FOREIGN PATENT DOCUMENTS

| | | |
|---|---|---|
| CN | 201637918 U | 11/2010 |
| JP | 11-233858 A | 8/1999 |
| WO | WO 00/22703 A1 | 4/2000 |

* cited by examiner

PRISM BEAM EXPANDER ADJUSTMENT APPARATUS AND METHOD FOR ADJUSTING THE SAME

CROSS-REFERENCE TO RELATED APPLICATIONS

The subject application is a continuation-in-part of PCT international application PCT/CN2013/001645 filed on Dec. 25, 2013, which in turn claims priority on Chinese patent application No. CN 201210585245.6 filed on Dec. 28, 2012. The contents and subject matter of the PCT and Chinese priority applications are incorporated herein by reference.

TECHNICAL FIELD

The present invention relates to a prism beam expander, in particular, a prism beam expander adjustment apparatus and method for adjusting the same, which is mainly suitable for precisely fixing the incidence angle of the prim in the prism beam expander.

BACKGROUND OF THE INVENTION

The prism beam expander has advantages including compact structure, simple alignment, low costs, and minimized chromatic aberration. The most important application of the prism beam expander is to realize one-dimensional beam expansion and collimation for the laser beam before the incidence on the optical grating, while reducing the energy density of the beam and decreasing the divergence angle of the beam. In the high gain laser cavity, an ultra narrow linewidth laser may be achieved through a beam expander and an optical grating operated in Littrow configuration, while the loss of the laser efficiency may be minimal. Therefore, the prism beam expander is widely used in spectral linewidth narrowing modules of dye pulse lasers and excimer lasers. See U.S. Pat. No. 7,366,219.

In order to obtain narrower laser linewidth, the beam magnification needs to be increased. However, the beam magnification of the prism beam expander is associated with the number of prisms and the incidence angle of each prism. See Zhang Haibo et al., "Optimized design of the prism beam expander within the narrow linewidth excimer laser cavity," Chinese Journal of Lasers 38, 1102008 (2011). On one hand, the beam magnification of the prism beam expander is sensitive to the prism incidence angle. In order to guarantee the beam magnification and the output laser linewidth in the prism beam expander, the incidence angle of each prism should be correctly demarcated. It is relatively easy to demarcate the incidence angle of a single prism without interference by adjacent prisms. The technical issue to be solved is to correctly demarcate the incidence angle of a plurality of adjacent prisms in the prism beam expander. On the other hand, the antireflection film of prisms has a good antireflection effect only in the scope of a narrow incidence angle. In order to improve the transmission of the beam of the coated prism and decrease laser cavity losses, the incidence angle of the prism should be consistent with the angle corresponding to the transmission peak of the prism, and the incidence angle of the prism should also be correctly demarcated. In addition, since the pitching of the prism affects the output energy of the laser, in order to improve the laser efficiency, the pitching of each prism should be tuned so that each prism in the prism beam expander is parallel.

SUMMARY OF THE INVENTION

The present invention provides an apparatus and a method for prism beam expander adjustment. The prism beam expander adjustment apparatus may precisely demarcate the incidence angle of the prism, and guarantee the total beam magnification of the prism beam expander as well as the depth of parallelism of the prism. Because the beam magnification is sensitive to the incidence angle of the prism and the output linewidth of the laser, it is important that incidence angle of each prism should be fixed as designed.

The present invention provides an apparatus for adjusting a prism beam expander having a light source, a baseplate, a precise rotary stage, support columns, a two-dimensional slide stage, the first 90-degree bellcrank lever, an indication light source, the second 90-degree bellcrank lever, an optical filter, a photodetector, an assembly platform, and a computer, and the spatial relationship of the components is as follows:

In one embodiment of the present invention, the apparatus has the precise rotary stage that is fixed on the platform, the two-dimensional slide stage is fixed by support columns and is located right above the platform, the vertical end of a first 90-degree bellcrank lever is fixed on the platform, the indication light source is fixed to the end of the horizontal end of a first 90-degree bellcrank lever, an indication light emitted by the indication light source extends vertically downwards and is coaxial with the precise rotary stage; the horizontal end of a second 90-degree bellcrank lever is fixed on the rotary surface of the precise rotary stage 3, the optical filter 9 and the photodetector 10 are fixed on the top of the vertical end of a second 90-degree bellcrank lever, the optical filter and the photodetector coaxially rotate with the precise rotary stage through a second 90-degree bellcrank lever; and the computer drives the precise rotary stage to rotate through the controller of the precise rotary stage. The light source 1 is collinear with the optical filter 9 and the photodetector 10.

In another embodiment of the present invention, the apparatus has the support columns and the two-dimensional slide stage being mounted on the baseplate; the assembly platform used to fix the position of the assembly plate of the prism beam expander is mounted on the support columns; the precise rotary stage and a vertical end of the first 90-degree bellcrank lever are fixed on the tunable surface of the two-dimensional slide stage; the indication light source is fixed to the horizontal top end of the first 90-degree bellcrank lever, an indication beam emitted by the indication light source irradiates vertically downwards and is collinear with the rotating shaft of the precise rotary stage; the horizontal end of the second 90-degree bellcrank lever is fixed on the rotary surface of the precise rotary stage, the optical filter and the photodetector are fixed on the vertical top end of the second 90-degree bellcrank lever, the optical filter and the photodetector coaxially rotate with the precise rotary stage through the second 90-degree bellcrank lever; the computer drives the precise rotary stage to rotate through the controller of the precise rotary stage; and the light source is collinear with the optical filter and the photodetector.

In the present invention, the light source may be an excimer laser, a dye laser, or a helium-neon laser.

In the present invention, the precise rotary stage may have a controller and a driver software.

In the present invention, the number of the support columns is at least 2, so as to ensure the reliability of the 2-dimensional slide stage.

In the present invention, the 2-dimensional slide stage is adjustable on the x-y plane, and ensures that the incidence surface of each prism of the prism expander intersects the beams emitted from the indication light source.

In the present invention, the vertical height of the first 90-degree bellcrank lever may be adjusted.

In the present invention, the indication light source is a visible collimating point light source.

In the present invention, the second 90-degree bellcrank lever is inverted L-shaped, and the horizontal length and vertical height are both adjustable. The second 90-degree bellcrank lever at its shortest horizontal length and lowest vertical height may enable the optical filer and photodetector to rotate at 360 degree without contacting the support columns and the 2-dimensional slide stage.

In the present invention, the optical filter correlates with the wavelength of the light source. The optical filter is selected according to the wavelength of the transmitted light thereof in accordance with the wavelength of the incidence laser of the photodetector.

In the present invention, the photodetector may be a photodiode or CCD detector. A slit is located in front of a window of the photodetector.

The method for adjusting the prism expander by using the apparatus of the present invention has the steps of fixing the assembly plate and tuning the indication light source; determining the direction of the un-deflected light source beam; adjusting the rotating shaft of the prism to be coaxial with the indication beam; determining the direction of the deflected light source beam; rotating the prism and determining the incidence angle; mounting the prism; and repeating the above steps until the next prism is demarcated and mounted. Finally, the steps are repeated until each prism of the prism beam expander is completely assembled with the target incidence angle.

In the present invention, the incidence angle of the multiple prisms in the expander may be orderly determined. Once the target incidence angle, the geometrical shape of prisms, and the optical refractive index of the prism material at the incident laser wavelength are determined, the deflection angle of the prism may be calculated according to principles of the geometrical optics. According to the calculated deflection angle, the precise rotary stage is driven to rotate the optical filter and the photodetector from the direction of the incidence beam to the direction of the exit beam of the prism. Then, the prism is tuned until that the exit beam is normal incidence to the photodetector. As a result, the target incidence angle of each prism of the multiple-prism beam expander may be demarcated successively.

The present invention uses a visible indication light source to mark the intersection point of the incidence laser beam and incidence surface of the prism and to ensure that the rotation axis of the precise rotate stage and that of tuned prism are identical. As a result, the consistence of the effective rotating angle and the designed incidence angle are guaranteed.

The optical filter not only improves the signal-to-noise ratio of the photodetector, but also determines the incident direction of the expanded laser beam by observing the direction of the reflected beam of the optical filter. The expanded beam and the photodetector are coaxial only when the reflected laser beam coincides with the incident laser beam, thus improving the demarcation accuracy of the incidence angle.

The center height of the photodetector is consistent with that of the light source. The incidence beam and exit beam of the prism should all impinge the center of the photodetector. The horizontal pitching of the prism is analyzed by observing where the exit beam of the prism impinges the photodetector. Therefore, the present invention not only guarantees the target beam magnification of the prism beam expander, but also obtains good parallel of the prisms.

DETAILED DESCRIPTION OF THE INVENTION

Figure 1A:
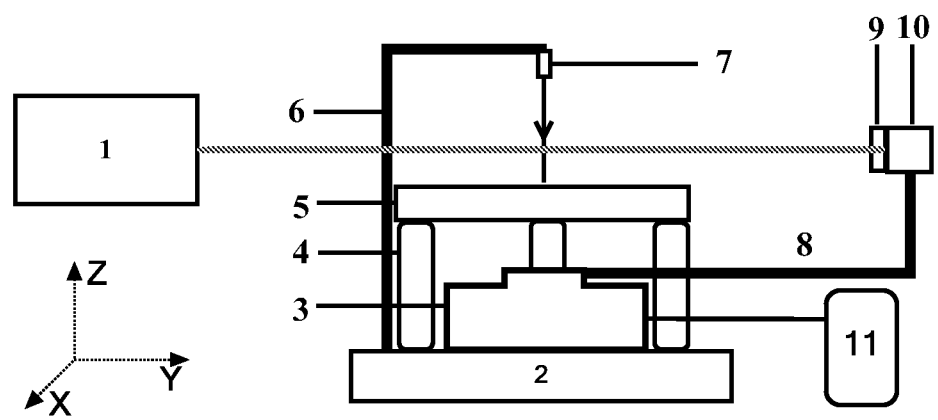
FIG. 1A is a schematic diagram showing one preferred embodiment of the structure of the prism beam expander adjustment apparatus of the present invention.

The prism beam expander adjustment apparatus of the present invention includes a light source 1, a baseplate 2, a precise rotary stage 3, support columns 4, a two-dimensional slide stage 5, a first 90-degree bellcrank lever 6, an indication light source 7, a second 90-degree bellcrank lever 8, an optical filter 9, a photodetector 10, a computer 11, and an assembly platform 12.

Figure 2A:
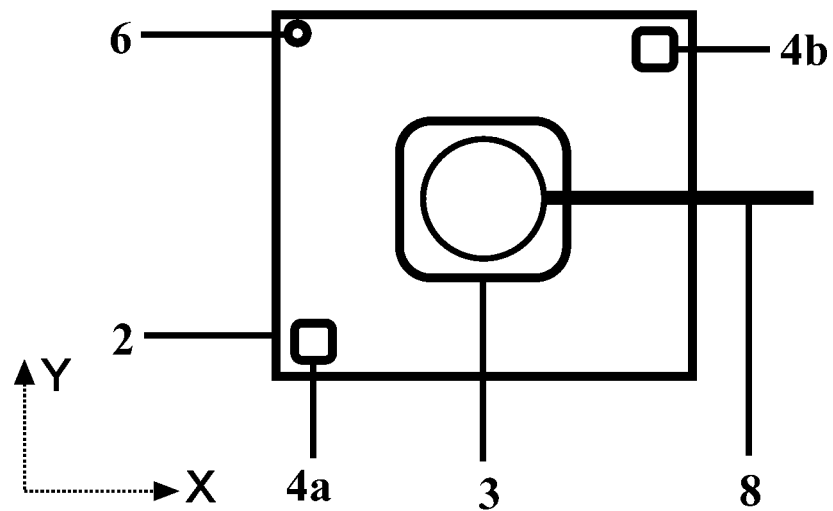
FIG. 2A is a top view of the first preferred embodiment of the present invention showing the spatial relationship among the precise rotary stage, the 90-degree bellcrank levers, and the support columns.

In the first preferred embodiment of the present invention as shown in FIGS. 1A and 2A, the precise rotary stage 3 is fixed on the baseplate 2, two-dimensional slide stage 5 is fixed by support columns 4 (shown as 4a and 4b in FIG. 2A) and is located right above the baseplate 2, the vertical end of the first 90-degree bellcrank lever 6 is fixed on the baseplate 2, the indication light source 7 is fixed to the end of the horizontal end of the first 90-degree bellcrank lever 6, an indication light emitted by the indication light source 7 extends vertically downwards and is collinear with the rotating shaft of the precise rotary stage 3; the horizontal end of the second 90-degree bellcrank lever 8 is fixed on the rotary surface of the precise rotary stage 3, the optical filter 9 and the photodetector 10 are fixed on the top of the vertical end of a second 90-degree bellcrank lever 8, the optical filter 9 and the photodetector 10 coaxially rotate with the precise rotary stage 3 through a second 90-degree bellcrank lever 8; and the computer 11 drives the precise rotary stage to rotate through the controller of the precise rotary stage 3. The light source 1 is collinear with the optical filter 9 and the photodetector 10.

Figure 1B:
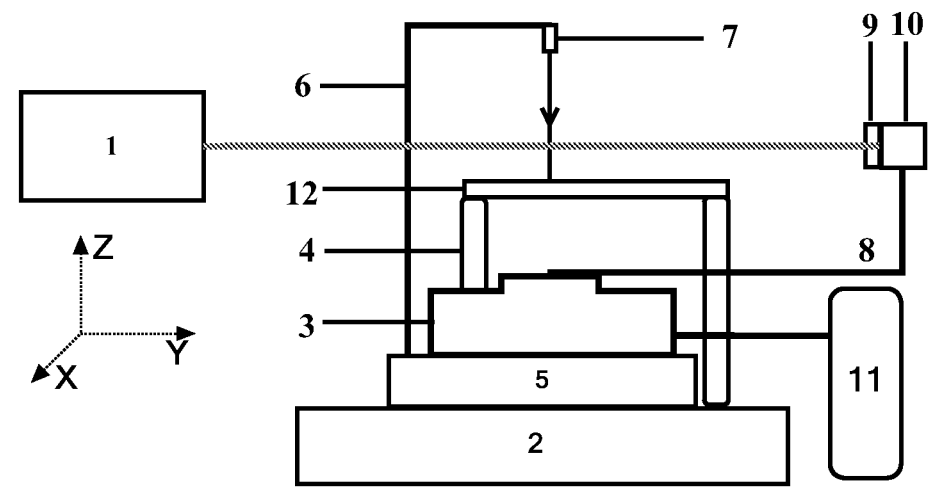
FIG. 1B is a schematic diagram showing a second preferred embodiment of the structure of the prism beam expander adjustment apparatus of the present invention.
Figure 2B:
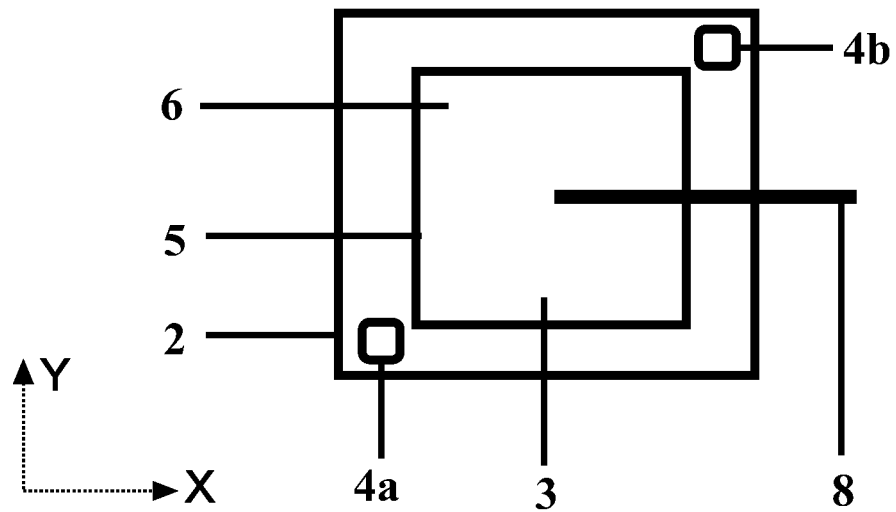
FIG. 2B is a top view of the second preferred embodiment of the present invention showing the spatial relationship among the precise rotary stage, the 90-degree bellcrank levers, and the support columns.

In the second preferred embodiment of the present invention as shown in FIGS. 1B and 2B, the support columns 4 and the two-dimensional slide stage 5 are mounted on the baseplate 2; the assembly platform 12 which is used to fix the position of the assembly plate of the prism beam expander is mounted on the top of the support columns 4 (shown as 4a and 4b in FIG. 2B); the precise rotary stage 3 and the first right curved bar 6 are fixed on the tunable surface of the two-dimensional slide stage 5; the indication light source 7 is fixed to the horizontal top end of the first 90-degree bellcrank lever 6, an indication beam emitted by the indication light source 7 irradiates vertically downwards and is collinear with the rotating shaft of the precise rotary stage 3; the horizontal end of the second 90-degree bellcrank lever 8 is fixed on the rotary surface of the precise rotary stage 3, the optical filter 9 and the photodetector 10 are fixed on the vertical top end of the second 90-degree bellcrank lever 8, the optical filter 9 and the photodetector 10 coaxially rotate with the precise rotary stage 3 through the second 90-degree bellcrank lever 8; the computer 11 drives the precise rotary stage 3 to rotate through the controller of the precise rotary stage 3; and the light source 1 is collinear with the optical filter 9 and the photodetector 10.

The light source 1 may be an excimer laser, a dye laser, or a helium-neon laser. The precise rotary stage 3 may have a controller and driving software. The number of the support columns is at least 2, so as to ensure the reliability of the 2-dimensional slide stage 5. The 2-dimensional slide stage 5 is adjustable on the x-y surface, and ensures that the incidence surface of each prism of the prism expander intersects the beams emitted from the indication light source 7. The vertical height of the first 90-degree bellcrank lever 6 may be adjusted. The indication light source 7 is a visible collimated point light source. The second 90-degree bellcrank lever 8 is inverted L-shaped, and the horizontal length and vertical height are both adjustable. The second 90-degree bellcrank lever 8 at its shortest horizontal length and lowest vertical height enables the optical filer 9 and the photodetector 10 to rotate at 360 degree without contacting the support columns 4 and the 2-dimensional slide stage 5. The optical filter 9 correlates with the wavelength of the light source 1 such that the optical filter 9 is selected according to the wavelength of the transmitted light thereof in accordance with the wavelength of the incidence laser of the photodetector 10. The photodetector 10 is a photodiode or CCD detector, and the window of the photodetector is fit with an aperture.

Figure 3:
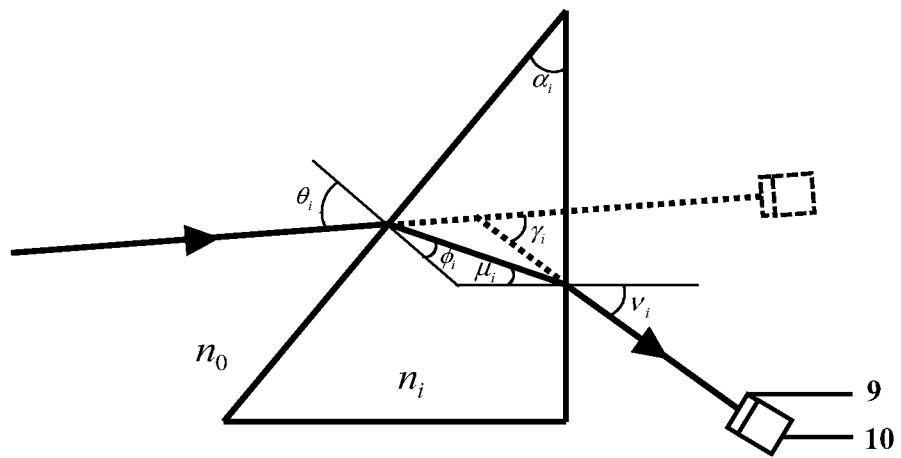
FIG. 3 is a diagram showing the optical path of the transmission of the light source beam in the prism. The relation between incidence angle and deflection angle is also illustrated.
Figure 4:
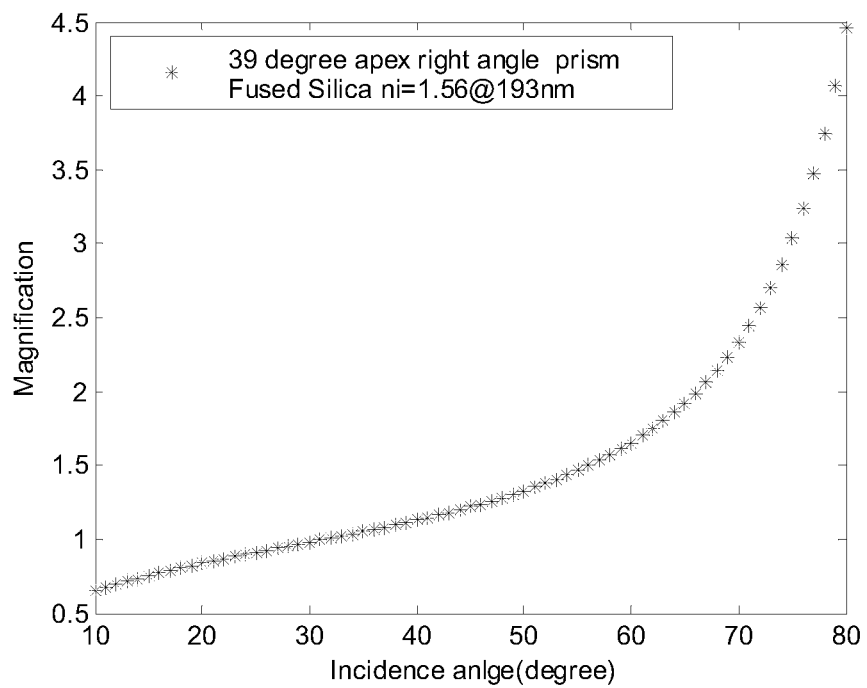
FIG. 4 is a curve showing the relationship between the incidence angle and the beam magnification of the prism.

According to the principles of the geometrical optics, the optical transmission trace of the laser beam emitted by the light source 1 in the $i^{th}$ prism of the prism beam expander is shown in the FIG. 3. In accordance with the Snell laws, for the $i^{th}$ prism, $$\begin{cases} n_0 \sin\theta_i = n_i \sin\phi_i \\ n_i \sin\mu_i = n_0 \sin v_i \\ \phi_i + \mu_i = \alpha_i \end{cases} \quad (1)$$

where $\theta_i$ is the target designed incidence angle, $\phi_i$ is the refraction angle of the incident plane, $\mu_i$ is incidence angle of the exit plane, $v_i$ is the exit angle, $n_0$ and $n_i$ are the refractive indexes in air and the $i^{th}$ prism, respectively.

The deflection angle $\gamma_i$ of the $i^{th}$ prism is given by $$\gamma_i = \theta_i - \alpha_i + v_i, \quad (2)$$

according to the equation (1), the relationship between the exit angle $v_i$ and the incidence angle $\theta_i$, as well as the prism vertex angle $\alpha_i$ is can be written as follows, $$\gamma_i = \theta_i - \alpha_i + \sin^{-1}\left[\sin\alpha_i \sqrt{(n_i/n_0)^2 - \sin^2\theta_i} - \cos\alpha_i \sin\theta_i\right]. \quad (4)$$

Thus, the deflection angle $\gamma_i$ can be rewritten as:

$$\sin v_i = \sin\alpha_i \sqrt{(n_i/n_0)^2 - \sin^2\theta_i} - \cos\alpha_i \sin\theta_i. \quad (3)$$

As shown in the above relation formula (4), the deflection angle $\gamma_i$ of the laser beam in the $i^{th}$ prism can be calculated if the target incidence angle is given. Since the optical paths are reversible, when the exit beam of the prism is adjusted to coincide with the direction of the target deflection, the incidence angle of the light source beam can be determined to be the target incidence angle $\theta_i$. The main principle of the invention that demarcates the target incidence angle is through the corresponding deflection angle of the prism.

The deflection angle is defined as the difference angle between the incidence beam and exit beam of the prism. The deflection angle of the prism has an ascertained value for a given incidence angle beam. Therefore, the incidence angle may be indirectly obtained by measuring the deflection angle. The method for adjusting the prism beam expander is described in details and as shown in the figures. The method of the present invention may be used in connection with any of the embodiments of the apparatus of the present invention. As the processing procedures for demarcating the incidence angle of each prism are the same, one takes an arbitrarily selected $i^{th}$ prism (i is a positive integer, no larger than the total number of prism beam expander prisms) as an example as follows.

Step 1. fixing the assembly plate and tuning the indication light source 7. The assembly plate of the prism beam expander is fixed on the assembly platform 12, the two-dimensional slide stage 5 is tuned until the indication beam emitted by the indication light source 7 intersects the center of the exit beam of the i−1$^{th}$ prism (if i=1, the exit beam is equal to the beam emitted by the light source 1).

Step 2. determining the direction of the un-deflected light source beam. Before the $i^{th}$ prism is placed, the second 90-degree bellcrank lever 8 is adjusted, and the precise rotary stage 3 drives until the photodetector 10 is coaxial with the light source beam emitted by the light source 1, so that the light source beam is vertically incident onto the optical filter 9 and the photodetector 10. The angle $\beta_{i1}$ of the precise rotary stage 3 at this direction is recorded.

Step 3. adjusting the rotating shaft of the $i^{th}$ prism to be coaxial with the indication beam. According to the layout of the prism beam expander and the direction of the incidence beam, the $i^{th}$ prism is positioned on the assembly plate properly so that the rotating shaft of the $i^{th}$ prism is coaxial with that of the precise rotary stage 3.

Step 4. determining the direction of the deflected light source beam. Firstly, the lengths of the horizontal and vertical directions of the second 90-degree bellcrank lever 8 are adjusted to make ensure that the precise rotary stage 3 and the second 90-degree bellcrank lever 8 rotate freely without intersecting with the support columns 4. Secondly, the computer 11 drives the precise rotary stage 3 to rotate the optical filter 9 and the photodetector 10 to the $\beta_{i2}$ direction, and then, locks the precise rotary stage 3. Then, the horizontal and vertical direction lengths of the second 90-degree bellcrank lever 8 are restored so that the height of the photodetector 10 is consistent with that of the beam emitted by the light source 1, where $\beta_{i2}$ satisfies the relationship:

$$\beta_{i2} = \beta_{i1} + \gamma_i, \quad (5)$$

in which, $\beta_{i1}$ and $\beta_{i2}$ are the angles corresponding to the beam direction before and after the light source beam as recorded by the precise rotary stage 3 is incident to the $i^{th}$ prism, and $\gamma_i$ is the deflection angle of the $i^{th}$ prism whose incidence angle is $\theta_i$, and it can be calculated by formula (4).

Step 5. rotating the $i^{th}$ prism and realizing predetermined the incidence angle The $i^{th}$ prism is rotated around the shaft of the indication beam emitted by the indication light source 7 until the exit beam of the $i^{th}$ prism is vertically incident to the optical filter 9 and the photodetector 10. It means that the deflection angle of the $i^{th}$ prism equal to 7 which corresponds to the target incidence angle $\theta_i$. Whether the light source beam is vertically incident to the optical filter 9 is determined as follows: the incident beam of the light source to the optical filter 9 creates some partial reflection light; when the reflection light spot backtracks along the incident beam, it proves that the light source beam is vertically incident to the optical filter 9 as well as the photodetector 10, and the incidence angle of the light source beam is the target incidence angle $\theta_i$ at this direction.

Step 6. mounting the prism. After that the exit beam of the $i^{th}$ prism is normal incidence with the optical filter 9 as well as the photodetector 10 and that the deflection beam transmits to the target direction are confirmed, the $i^{th}$ prism is fixed on the assembly plate by glue or a depression bar. During the rotation and mounting of the prism, there are two ways to ensure that various prisms of the prism beam expander are parallel: first, the light source beam should be incident onto the center position of the photodetector 10 after being expanded by the prism, and if the position in which it is incident onto the photodetector 10 deviates from the center position, it means that the pitching of the prism should be adjusted; second, the parallel of the $i^{th}$ prism can be judged by observing whether the exit light spot of the exit surface of the prism completely coincides with the relative position of the reflection light spot of the optical filter 9.

Step 7. demarcating the next prism. The exit beam of the $i^{th}$ prism is being used as the incident beam of the $i+1^{th}$ prism, and steps 2 to 6 are repeated for demarcating and mounting the $i+1^{th}$ prism;

Step 8. ending. The above steps are repeated until each prism of the prism beam expander are completely assembled with the target incidence angle.

Experimental data confirm that the incidence angles of all prisms of the prism beam expander are precisely demarcated and correct beam magnification are obtained with the apparatus of the present invention. The parallel of the prisms is guaranteed by monitoring the pitching of the prisms in the adjustment process. Thus, the present invention reduces the loss generated by the application of the prism beam expander, and provides precise adjustment of the prism beam expander.

We claim:

1. An apparatus for adjusting a prism beam expander, comprising
   a light source,
   a baseplate,
   a precise rotary stage,
   support columns,
   a two-dimensional slide stage,
   a first 90-degree bellcrank lever,
   an indication light source,
   a second 90-degree bellcrank lever,
   an optical filter,
   a photodetector,
   a computer, and
   an assembly platform,
   wherein the indication light source is fixed to a horizontal top end of the first 90-degree bellcrank lever;
   an indication beam emitted by the indication light source irradiates vertically downwards and is collinear with a rotating shaft of the precise rotary stage;
   a horizontal end of the second 90-degree bellcrank lever is fixed on the rotary surface of the precise rotary stage;
   the optical filter and the photodetector are fixed on a vertical top end of the second 90-degree bellcrank lever;
   the optical filter and the photodetector coaxially rotate with the precise rotary stage through the second 90-degree bellcrank lever;
   the computer drives the precise rotary stage to rotate through a controller of the precise rotary stage; and
   the light source is collinear with the optical filter and the photodetector.

2. The apparatus of claim 1, wherein the support columns and the two-dimensional slide stage are mounted on the baseplate; the assembly platform used to fix a position of an assembly plate of the prism beam expander is mounted by the support columns; and the precise rotary stage and a vertical end of the first 90-degree bellcrank lever are fixed on a tunable surface of the two-dimensional slide stage.

3. The apparatus of claim 1, wherein the precise rotary stage is fixed on the baseplate; the two-dimensional slide stage is fixed by support columns and is located above the baseplate; and a vertical end of the first 90-degree bellcrank lever is fixed on the baseplate.

4. The apparatus of claim 1, wherein the light source is an excimer laser, a dye laser, or a He—Ne laser.

5. The apparatus of claim 1, wherein the precise rotary stage comprises a controller and driver software.

6. The apparatus of claim 1, wherein there are at least two support columns so as to ensure reliability of the assembly platform.

7. The apparatus of claim 1, wherein the two-dimensional slide stage is adjustable in X-Y plane so as to ensure that an incident plane of each prism in the prism beam expander is intersected with an indication beam emitted by the indication light source.

8. The apparatus of claim 1, wherein height of a vertical bar of the first 90-degree bellcrank lever is adjustable.

9. The apparatus of claim 1, wherein the indication light source is a visible collimating point light source.

10. The apparatus of claim 1, wherein the second 90-degree bellcrank lever is inverted L-shaped, lengths in its horizontal direction and vertical direction are adjustable, and shortest lengths in the horizontal direction and vertical direction enable the optical filter and the photodetector to rotate by 360 degrees, without being intersected with the support columns and the two-dimensional slide stage.

11. The apparatus of claim 1, wherein working wavelength band of the optical filter is associated with a wavelength of the light source 1$m$ and the optical filter is changed according to a wavelength of a laser incidence to the photodetector.

12. The apparatus of claim 1, wherein the photodetector is a photodiode or a CCD, and a slit is located in front of a window of the photodetector.

13. A method for adjusting a prism beam expander according to claim 1, comprising fixing the assembly plate of the prism beam expander on the assembly platform and tuning the two-dimensional slide stage until the indication beam emitted by the indication light source intersects a center of an exit beam of the prism; adjusting the second 90-degree bellcrank lever and driving the precise rotary stage to an angle until the photodetector is coaxial with the light source beam emitted by the light source and the light source beam is vertically incident onto the optical filter and the photodetector, and recording the angle $\beta_{i1}$ of the precise rotary stage; adjusting position of the prism on the assembly plate so that the rotating shaft of the prism is coaxial with that of the precise rotary stage; adjusting length on the horizontal and vertical direction of the second 90-degree bellcrank without intersecting with the support columns, driving the precise rotary stage by the computer to rotate the optical filter and the photodetector to a $\beta_{i2}$ direction, locking the precise rotary stage, restoring the length on the horizontal and vertical direction of the second 90-degree bellcrank lever so that height of the photodetector is consistent with height of the beam emitted by the light source, wherein $\beta_{i2}$ satisfies a formula (5)

$$\beta_{i2}=\beta_{i1}+\gamma_i,$$

wherein, $\beta_{i1}$ and $\beta_{i2}$ are angles corresponding to the beam direction before and after the light source beam as recorded by the precise rotary stage is incident to the $i^{th}$ prism, and $\gamma_i$ is a deflection angle of the $i^t$ prism whose incidence angle is $\theta_i$, and is calculated by formula (4)

$$\gamma_i = \theta_i - \alpha_i + \sin^{-1}\left[\sin\alpha_i\sqrt{(n_i/n_0)^2 - \sin^2\theta_i} - \cos\alpha_i\sin\theta_i\right]$$

(4); rotating the $i^{th}$ prism around the shaft of the indication beam emitted by the indication light source until the exit beam of the $i^{th}$ prism is vertically incident to the optical filter and the photodetector, and ensuring that the light source beam is vertically incident to the optical filter; and confirming that the exit beam of the $i^{th}$ prism is normal incidence with the optical filter and the photodetector and that the deflection beam transmits to the target direction, fixing the $i^{th}$ prism on the assembly plate.

14. The method for adjusting a prism beam expander according to claim 13, further comprising using the exit beam of a preceding prism as an incident beam of a following prism, repeating steps of claim 11 to fix the following prism while ensuring that multiple prisms are parallel.

15. The method for adjusting a prism beam expander according to claim 14, further comprising continuing to fix each prism of the prism beam expander until the prism beam expander is completely assembled with the target incidence angle.

16. The method for adjusting a prism beam expander according to claim 14, further comprising ensuring that the light source beam is vertically incident to the optical filter by observing the incident beam of the light source to the optical filter and determining whether it creates partial reflection light: when the reflection light spot backtracks along the incident beam, the light source beam is vertically incident to the optical filter and the photodetector, and the incidence angle of the light source beam is the target incidence angle $\theta_t$ at the direction.

17. The method for adjusting a prism beam expander according to claim 14, further comprising comparing a position of the light source beam, after being expanded by the prism and being incident onto the photodetector, with a center position of the photodetector, and adjusting pitching of the prism when the position of the light source beam incident onto the photodetector deviates from the center position of the photodetector.

18. The method for adjusting a prism beam expander according to claim 14, further comprising comparing an exit light spot out of an exit surface of the prism with a reflection light spot of the optical filter, and adjusting pitching of the prism when the exit light spot does not overlap with the reflection light spot.

\* \* \* \* \*